United States Patent
McDaniel

(10) Patent No.: US 11,054,812 B2
(45) Date of Patent: Jul. 6, 2021

(54) SKILL INTERFACE FOR INDUSTRIAL APPLICATIONS

(71) Applicant: Siemens Aktiengesellschaft, Munich (DE)

(72) Inventor: Richard Gary McDaniel, Hightstown, NJ (US)

(73) Assignee: Siemens Aktiengesellschaft, Munich (DE)

( * ) Notice: Subject to any disclaimer, the term of this patent is extended or adjusted under 35 U.S.C. 154(b) by 72 days.

(21) Appl. No.: 16/324,368

(22) PCT Filed: Aug. 10, 2016

(86) PCT No.: PCT/US2016/046226
§ 371 (c)(1),
(2) Date: Feb. 8, 2019

(87) PCT Pub. No.: WO2018/031005
PCT Pub. Date: Feb. 15, 2018

(65) Prior Publication Data
US 2019/0171190 A1   Jun. 6, 2019

(51) Int. Cl.
*G05B 19/418* (2006.01)

(52) U.S. Cl.
CPC ..... *G05B 19/4187* (2013.01); *G05B 19/4188* (2013.01); *G05B 19/41815* (2013.01);
(Continued)

(58) Field of Classification Search
CPC .......... G05B 19/4187; G05B 19/41835; G05B 19/41855; G05B 19/4188;
(Continued)

(56) References Cited

U.S. PATENT DOCUMENTS 5,153,839 A * 10/1992 Cross ............... G05B 19/41835
                                                    29/33 M
6,271,927 B1 * 8/2001 Kohtani ................. G06K 15/00
                                                    358/1.13
(Continued)

FOREIGN PATENT DOCUMENTS

JP      H0675972 A      3/1994
JP      H1139018 A      2/1999
(Continued)

OTHER PUBLICATIONS

Japanese Office Action dated Mar. 9, 2020; JP Application No. 2019106323; 20 pages.
(Continued)

*Primary Examiner* — Thomas C Lee
*Assistant Examiner* — Charles Cai

(57) ABSTRACT

A cyber-physical production system includes a plurality of cyber-physical units configured to collectively produce a product comprising one or more workpieces. Each cyber-physical units comprises one or more automation system devices, a network interface and a processor. The network interface is configured to receive one or more skill instances. Each skill instance provides a machine-independent request for transformation of a workpiece by the one or more automation system devices. The processor is configured to execute each of the one or more skill instances by applying behaviors that control the automation system devices.

13 Claims, 9 Drawing Sheets

(52) U.S. Cl.
CPC . *G05B 19/41835* (2013.01); *G05B 19/41855* (2013.01); *G05B 2219/25417* (2013.01); *G05B 2219/25418* (2013.01); *G05B 2219/31052* (2013.01); *G05B 2219/31053* (2013.01); *Y02P 90/02* (2015.11)

(58) Field of Classification Search
CPC .... G05B 19/41815; G05B 2219/25418; G05B 2219/31052; G05B 2219/31053; G05B 2219/25417; G05B 19/41885; G05B 19/418; Y02P 90/18; Y02P 90/08; Y02P 90/04

See application file for complete search history.

(56) References Cited

U.S. PATENT DOCUMENTS

| | | | |
|---|---|---|---|
| 6,970,903 | B1 | 11/2005 | Toivonen |
| 8,145,333 | B2 | 3/2012 | Vrba et al. |
| 2005/0015681 | A1* | 1/2005 | Strole ................. H04L 12/413 714/47.1 |
| 2006/0224250 | A1 | 10/2006 | Callaghan |
| 2010/0138017 | A1 | 6/2010 | Vrba et al. |
| 2011/0251865 | A1 | 10/2011 | Yuen et al. |
| 2015/0301521 | A1 | 10/2015 | Byron et al. |
| 2015/0324490 | A1* | 11/2015 | Page ................. G06Q 30/0621 700/98 |
| 2016/0112262 | A1* | 4/2016 | Johnson ............. H04L 61/1511 709/221 |

FOREIGN PATENT DOCUMENTS

| | | |
|---|---|---|
| JP | 2002519746 A | 7/2002 |
| JP | 2003291083 A | 10/2003 |
| RU | 2005120689 A | 1/2006 |
| RU | 2364917 C2 | 8/2009 |
| RU | 117667 U1 | 6/2012 |
| WO | 2016074730 A1 | 5/2016 |

OTHER PUBLICATIONS

Search Report dated Nov. 8, 2019; RU Application No. 2019106323; Filing Date: Aug. 10, 2016; 2 pages.

International Search Report dated Apr. 10, 2017; Application No. PCT/US2016/046226; Filing Date; Aug. 10, 2016; 17 pages.

Leitao et al: "Agent-based distributed manufacturing control: A state-of-the-art-survey"; Engineering Applications of Artifical Intelligence; Pineridge Press, Swansea; GB; vol. 22; No. 7; pp. 979-991; XP026602737; ISSN: 0952-1976, DOI:10.1016/J.ENGAPPAI.2008.09.005; / Jan. 10, 2009.

Laszlo Monostori: "Cyber-physical Production Systems: Roots, Expectations and R&D Challenges"; PROCEDIA CIRP; vol. 17; pp. 9-13; XP055224678; ISSN: 2212-8271, DOI:10.1016/j.procir.2014.03.115; / Jan. 1, 2014.

Korean Report of Exam dated Aug. 26, 2020; Application No. 10-2019-7006869; 4-pages.

Japanese Office Action dated Nov. 30, 2020; JP Application No. 2019-507263; 10 pages.

* cited by examiner

SKILL INTERFACE FOR INDUSTRIAL APPLICATIONS

This application is a national phase filing under 35 U.S.C. § 371 of International Patent Application No. PCT/US2016/046226, filed Aug. 10, 2016, which is incorporated herein by reference in its entirety.

TECHNICAL FIELD

The present invention relates generally to a skill interface for industrial application, along with methods, systems, and apparatuses related thereto. The disclosed technology may be applied to, for example, various automated production environments where programmable controllers are used.

BACKGROUND

Manufacturing processes are highly automated and may be divided into several hierarchical layers. For example, at the highest level, the enterprise resource planning (ERP) takes place, which may be referred to as a business layer. At lower levels, the hardware implementation and control take place, which may be referred to as various control or unit layer. An intermediate layer integrates and connects business and control layers. This intermediate layer includes a manufacturing execution system (MES) that defines an IVIES process in terms of data and interactions between functions, such as resource management, resource allocation, dispatching, data collection and acquisition, quality assurance management, maintenance management, performance analysis, scheduling, document control, labor management, and material and production tracking.

One challenge in designing industrial applications is machine-to-machine interactions are highly dependent upon how the IVIES implements the industrial application's processes. As a result, the robustness of the overall system is limited. When customization is required, it must be performed manually. For example, an operator or another worker in an industrial environment may read the work order, pick up the input materials for a particular process step, walk these materials over to the machines, and run the machines to accomplish the step. In some instances, machines such as cranes may facilitate transportation of items; but, in principle, any customization of the system remains dependent on human interaction with the system.

SUMMARY

Embodiments of the present invention address and overcome one or more of the above shortcomings and drawbacks, by providing methods, systems, and apparatuses related to a skill interface for industrial applications. The techniques described herein define the problem of communicating intent between multiple interacting devices in an automation application in terms of an abstraction called "skills." The purpose of skills is to standardize and simplify the process of setting up and executing processes in the automation. It is also used as the medium of communication between machines at the system level and to determine what operations to perform to compute optimization. A skill is related to a process as one would find in a MES, but may be implemented at the unit level.

According to one aspect of the present invention, a cyber-physical production system includes a plurality of cyber-physical units configured to collectively produce a product comprising one or more workpieces. In some embodiments, each of the cyber-physical units comprises a programmable logic controller. Each cyber-physical units comprises one or more automation system devices, a network interface, and a processor. The network interface is configured to receive skill instances that provide a machine-independent request for transformation of a workpiece by the automation system devices. In some embodiments, the network interface includes a web services interface that uses Representational State Transfer (REST) protocol to receive the skill instances. The processor is configured to execute each of the skill instances by applying behaviors that control the automation system devices. In some embodiments of the cyber-physical production system, at least one of the cyber-physical units corresponds to a transportation system which facilitates transportation of the workpiece between the other cyber-physical units included in the system.

According to some embodiments of the aforementioned cyber-physical production system, each cyber-physical units further comprises a unit order queue configured to store the skill instances prior to execution by the processor. The processor may be further configured to reorder the unit order queue based on a preferred sequence after entering the skill instance in the unit order queue. Additionally (or alternatively), the processor may be further configured to execute the skill instances in order, skipping skill instances that cannot be executed immediately. In some embodiments of the aforementioned cyber-physical production system, the processor is further configured to transmit a message to the cyber-physical production system indicating completion of a skill instance upon removal of the skill instance from the unit order queue for execution. The processor may also be configured to modify a skill state parameter of a skill instance upon removal of the skill instance from the unit order queue for execution.

In some embodiments, each cyber-physical units further comprises a scanner device configured to read a physical tag on the workpiece. This physical tag specifies a Universal Resource Identifier (URI) corresponding to the workpiece. The processor may use the URI to associate the skill instances in the unit order queue with the workpiece during execution. For example, in one embodiment, the skill instances comprise a key skill value matching the URI corresponding to the workpiece.

According to another aspect of the present invention, a computer-implemented method for using a skill interface to control a cyber-physical unit includes receiving a skill instance providing a machine-independent request for transformation of a workpiece by one or more automation system devices included in the cyber-physical unit. The skill instances are entered into a unit order queue comprising one or more additional skill instances. Once the skill instances are entered, the queue may be reordered. For example, in one embodiment, the method includes reordering the unit order queue based on a preferred sequence after entering the skill instance in the unit order queue. Then, each skill instance in the unit order queue is selectively executed by applying behaviors that control the automation system devices. In some embodiments, skill instances in the unit order queue are executed in order, skipping skill instances that cannot be executed immediately. Upon removal of a skill instance from the unit order queue for execution, a message may be transmitted to a cyber-physical production system indicating completion of the skill instance or a skill state parameter of the skill instance may be modified.

According to other embodiments of the present invention, a cyber-physical production system includes a transport cyber-physical unit which comprises a physical transport system, a transport network interface, and a processor. The transport network interface is configured to receive transport skill instances that provide a machine-independent request for transportation of a workpiece between other cyber-physical units included in the cyber-physical production system. The processor is configured to apply transport behaviors to the physical transport system to implement the transport skill instances. In some embodiments, the aforementioned cyber-physical production system further comprises one or more machining cyber-physical units. Each machining cyber-physical unit includes a physical machine for physically transforming the workpiece, a machining network interface that is configured to receive one or more machining skill instances by providing a machine-independent request for machining of the workpiece by the machining cyber-physical unit, and a processor that is configured to apply machining behaviors to the physical machines to implement the machining skill instances.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there are shown in the drawings embodiments that are presently preferred, it being understood, however, that the invention is not limited to the specific instrumentalities disclosed. Included in the drawings are the following Figures.

DETAILED DESCRIPTION

Figure 1:
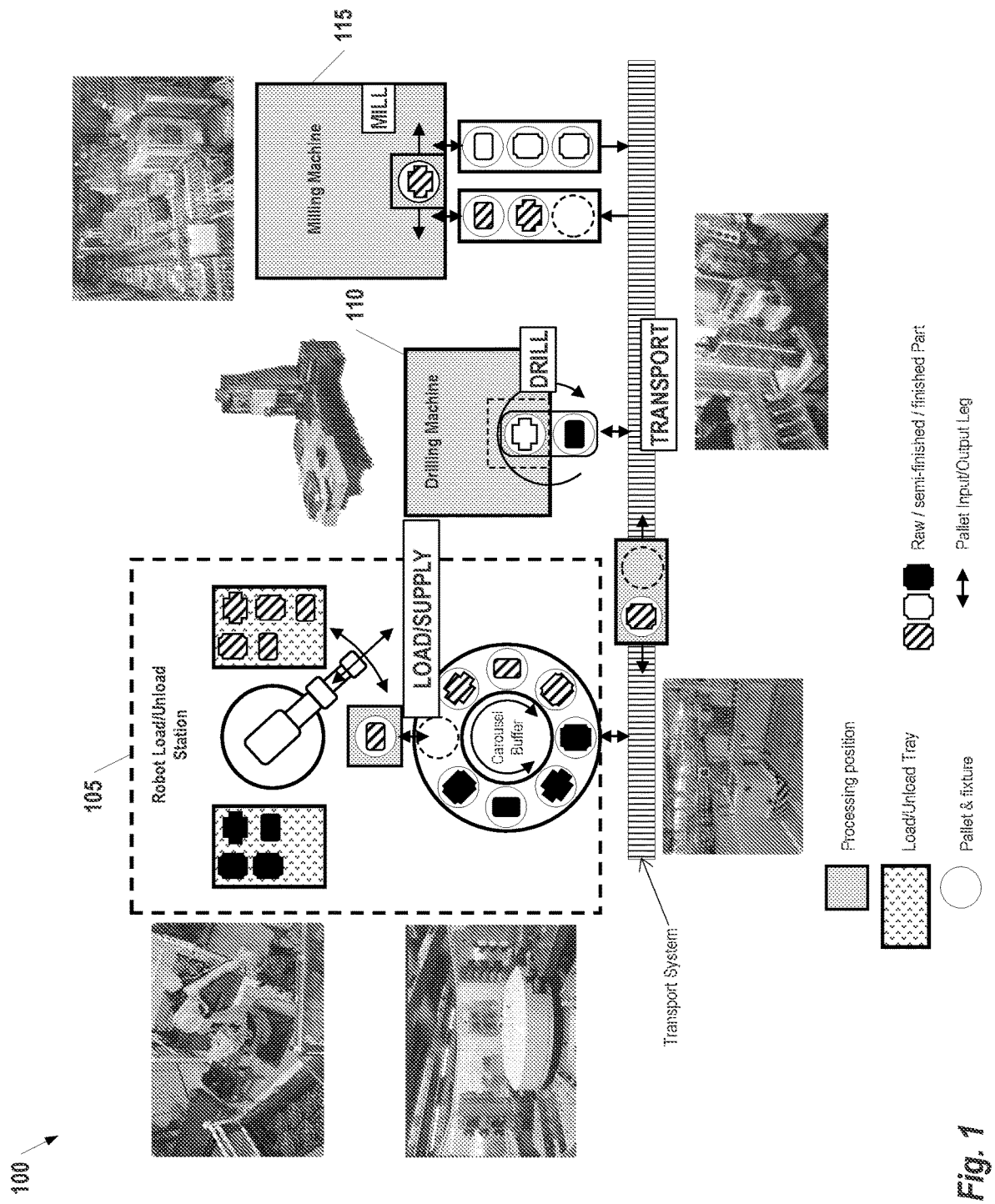
FIG. 1 illustrates an example Cyber-Physical Production System (CPPS) that automatically transports materials between autonomous machines, according to some embodiments.

The following disclosure describes the present invention according to several embodiments directed at methods, systems, and apparatuses associated with a skill interface which facilitates communications in autonomous processes. The term "skill," as used herein, refers to a machine-independent description of how a workpiece or material needs to be transformed so that it can be converted ultimately into the final product. The device that supports a skill interface is referred to herein as a Cyber-Physical Production Unit (CPPU) and the combined activities of multiple CPPUs are controlled by a Cyber-Physical Production System (CPPS).

The skill interface described herein may be used to control groups of units to create products collaboratively and automatically. Work products may be routed to different machines based on, for example, optimized costs or leveraged to create multiple products with the same suite of units, perhaps even simultaneously. The skill interface provides for introspection and selection so that an automated system may select machines dynamically and not rely on a fixed production path. A given CPPU may support several different skills that could be applied to different products and different CPPUs may support a common skill so that the system may choose which CPPU would be the more effective to use.

The implementation of the skill interface involves the definition of a skill's class. This can include, for example, a name for the skill as well as a set of parameters that describe how the workpiece is transformed. The CPPS can create an instance of a skill that describes what parameter values to use for a particular workpiece. The instance may be generic and applicable to any workpiece or may use a key that identifies which workpiece to affect. Instances are stored in a queue from which the unit retrieves them and unpacks the skill's parameters. The unit may also look ahead in the queue to select a skill to execute next since not all of the skills may be applied immediately. The unit then executes the skill by applying its parameters to the behaviors that control the various components, the physical and functional devices that actually do the work. Multiple skills may be executed simultaneously including skills of the same class depending on the physical limitations of the unit. When skills are complete, they can be removed from the queue and signaled to the IVIES as done.

Skills are the media used to communicate product information between suites of semi-autonomous production units. There are many reasons to employ a multitude of semi-intelligent devices to build products rather than create a fixed, hand-tooled, one product only factory. For example, if it is desired to create highly customized products or to create a variety of products with small lot sizes, using general-purpose machines in customizable configurations can be more cost-effective because the fixed cost of building up a whole factory for a single product is removed.

FIG. 1 illustrates an example Cyber-Physical Production System (CPPS) 100 that automatically transports materials between autonomous machines, according to some embodiments. In FIG. 1, a transport system carries material and work products between a Load/Unload Station 105, a Drilling Machine 110, and a Milling Machine 115 that each carry out processes that shape the workpieces into products.

The production system is divided into units that each can perform some aspects of the overall process. The Milling Machine 115, for example, might be used to form the overall shape of the product. The Drilling Machine 110 could be used to bore holes in the product that are too fine for the Milling Machine 115 to make. The Load/Unload Station 105 holds goods and materials until they are needed to be deployed on the other machines. The transport system moves work products to and from the machines where processing occurs. The individual segments of the CPPS 100 are called Cyber-Physical Production Units (CPPUs). The CPPUs are autonomous and intelligent such that much of the work they provide can be performed without supervision or special instruction.

In the example of FIG. 1, note that elements of the transport system, such as the device that carries a workpiece from the main conveyor to the drilling machine, are being considered as part of the CPPU of the Drilling Machine 110. It might be just as easily considered part of the transport unit. The division of labor between machines can potentially be arbitrary but is usually determined by several factors beyond the whim of the system integrator. For example, the part exchange system for the Drilling Machine 110 may be physically hardwired or otherwise attached to the drilling machine. If the process were to be reconfigured, it might not make sense to separate the drilling part loader from the drill because the loader could be a custom build and would not be used for any other purpose. Furthermore, the combination of drill with loader might make the Drilling Machine 110 as a whole more autonomous. Without the loader, the drill would need some other device or a person to place material inside to be drilled.

With the CPPUs determined, the goals of the process may then be communicated to the devices that carry them out. The skills of the CPPUs are then used to communicate what actions to take on the workpieces.

Figure 2:
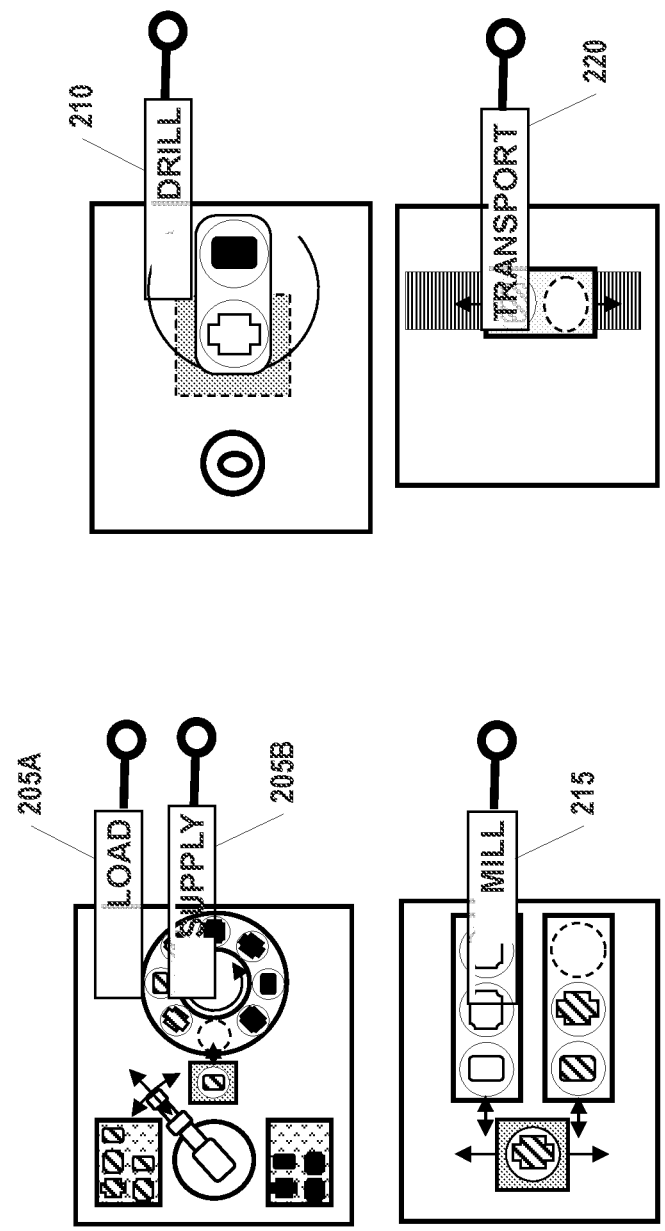
FIG. 2 provides a high-level overview of the Cyber-Physical Production Unit (CPPUs) and related skills for the example CPPS shown in FIG. 1, according to some embodiments.

FIG. 2 provides a high-level overview of the CPPUs and related skills for the example CPPS shown in FIG. 1, according to some embodiments. Each skill reflects operations that are applied to the work products and the key purposes for each unit. Thus, the Load/Unload Station 105 implements a Load Skill 205A and a Supply Skill 205B. The Drilling Machine 110 and the Milling Machine 115 implement a Drill Skill 210 and a Mill Skill 215, respectively. Finally, the conveyor system has a Transport Skill 220. To run the process, work products are shuttled to the various units via the Transport Skill 220. Products get shaped using the Mill Skill 215; products get holes with the Drill Skill 210, and so on. A planning system may be used to send the correct skill information to the correct units as they are needed.

Figure 3:
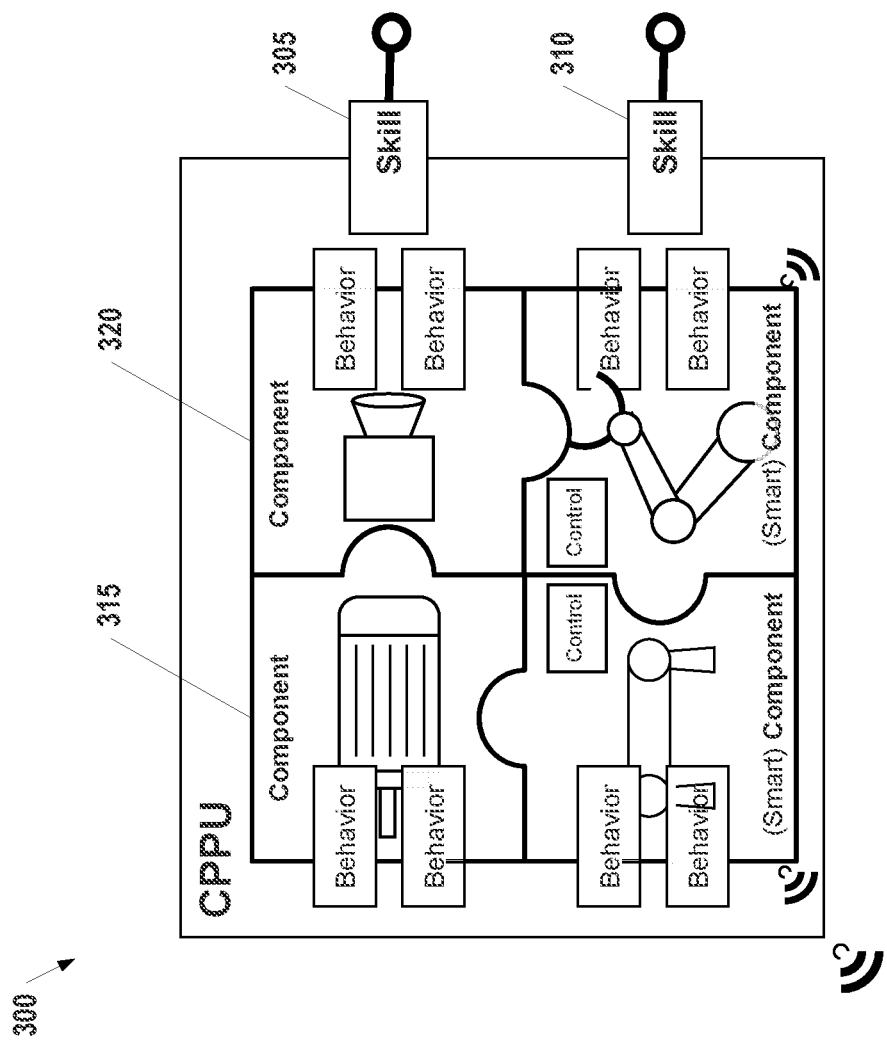
FIG. 3 provides an example of the composition of an individual CPPU 300, according to some embodiments.

FIG. 3 provides an example of the composition of an individual CPPU 300, according to some embodiments. The CPPU is where creation and modifications of products occur. It is considered cyber because it is controlled by the skills applied to it as part of the CPPS and it is generally fully automated; though, having human assistance may also be used in some embodiments. A CPPU is intended to work autonomously in that it does not require actions from other CPPUs to function outside of the transport system that might bring work products in and out of the unit. A CPPU should also be intelligent in that it has the ability to interpret the desired product information from the applied skills and be able to execute its own behaviors in order to achieve that result.

The CPPU shown in FIG. 3 comprises two Components 315, 320 that comprise physical assets that perform work as well as ancillary devices that feed material, change tools, spray chemicals, sense positions, and any other things that the unit needs to do. These items are called components. The example of FIG. 3 shows a robot, a camera, a motor, and a conveyor belt as included in the Components 315, 320; however, it should be understood that any physical assets can generally be included in a component of the CPPU.

Skills 305, 310 act as the interface to the CPPU 300. In FIG. 3, the Skills 305, 310 are depicted with an interface symbol to indicate that communication occurs from the outside to apply the skill to the CPPU. The communication medium could possibly be a kind of networking protocol that allows for arbitrary and variable length messages. For example, messages sending data to and from a web server would fulfill this kind of protocol.

Between the Skills 305, 310 that tell the machine what needs to get done and the Components 315, 320 that act to do the work are behaviors that includes all the intrinsic and programmatic functions that describe how actually to carry out the work. Behavior is defined as the fundamental activity that components perform. The activity could be physical or computational. For example, a robot arm can move its end effecter in space as a physical behavior. If the function for determining the end point to which the robot moves is also considered, then this behavior is also computational as in that point needs to be computed. Though it may be possible to differentiate between pure physical behavior and abstract computational behavior, in principle, most application behavior will be a combination of both. Thus, behavior may be defined as what the production components do regardless of how that might affect the state of the work product. For example, a conveyor can be turned on and off. Its behavior would be to run the belt when it is turned on. If there happens to be product on the belt, it would move, but the conveyor's behavior itself is not concerned with this issue. The conveyor is able to run whether a product is there or not.

Figure 4:
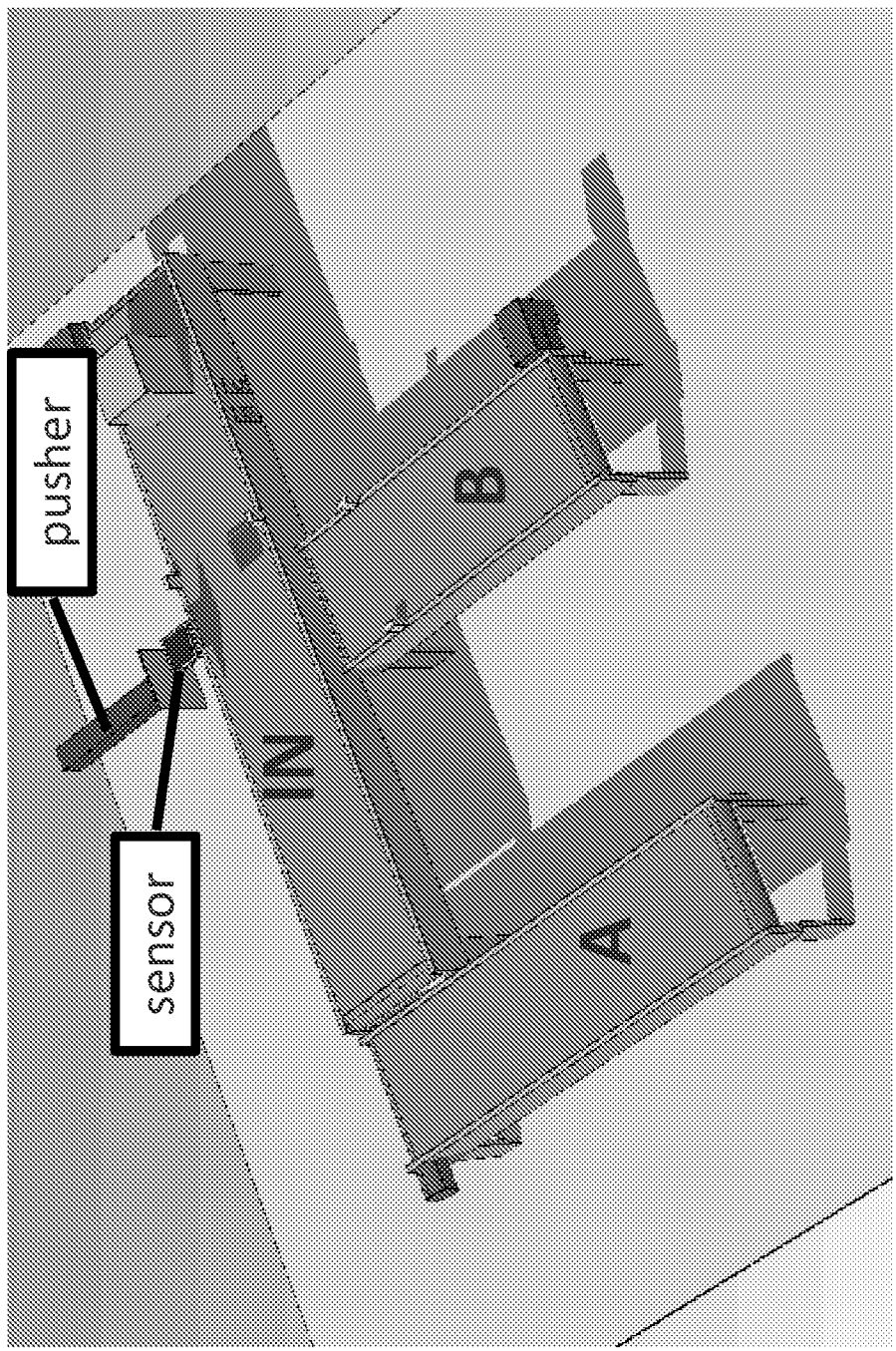
FIG. 4 shows an example scenario which includes a set of three conveyors arranged along with other sensors and a pusher.

Of course, the combined activities of components do affect work products. Staying with the conveyor example, a conveyor's behavior is to run, and the things on top of the conveyor will move. FIG. 4 shows an example scenario which includes a set of three conveyors arranged along with other sensors and a pusher. The purpose of this application might be to sort incoming products. If products are introduced at the location of the gray box on the right side of the IN conveyor, a sensor can determine whether boxes should be sent down the A or B conveyor (and onto other processes). The pusher's behavior is to extend and retract and if extended at the right time, it will push a box onto conveyor B. The combined behaviors of these components act to change the state of the work products; the boxes go from a state of unsorted to becoming sorted. So, the "skill" of this application is to sort boxes. A skill for this device might be formulated as "SORT (box_id, dest)" or in other words, given a particular box, put it on a particular destination conveyor. An instance of this skill could be "SORT (box_id=1007, dest=B)" which causes box number 1007 to be placed onto belt B.

Other kinds of skills could affect the work product more directly. For example, the workpiece could be altered by cutting, milling, or drilling into it. Multiple workpieces can be assembled to form a combined part and it might be glued or fastened together. In general, skills determine the purpose of a production unit in the context of the production system by declaring how it will modify the work product. Thus, a skill is effectively a directive that is exposed to the outside that clarifies what the unit is supposed to do.

Figure 5:
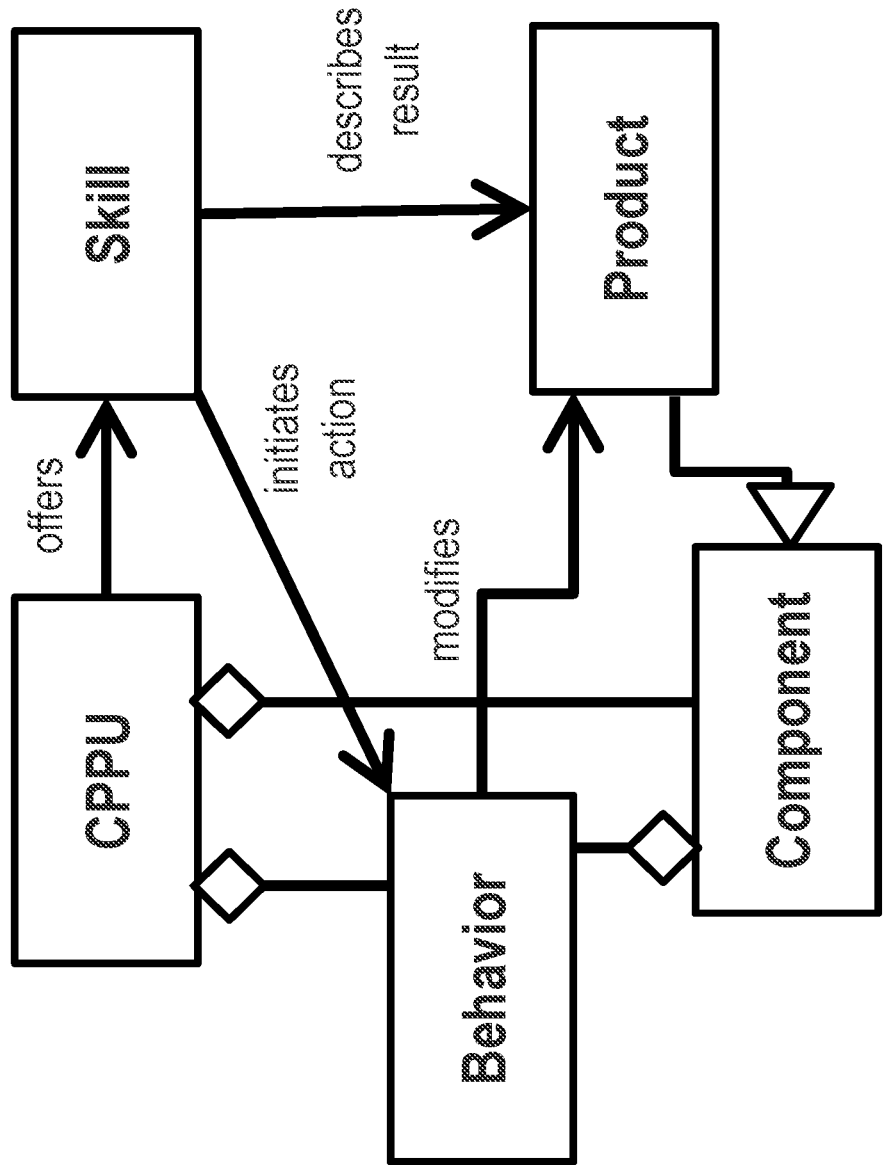
FIG. 5 an ontology for a CPPU, as it may be implemented in some embodiments of the present invention. The CPPU comprises behaviors, components, and skills.

FIG. 5 shows an ontology for a CPPU, as it may be implemented in some embodiments of the present invention. The CPPU comprises behaviors, components, and skills. The behaviors are defined as entities that describe how the components work as well as how they work together. So, the logic of the application program is also considered behavior along with the physical behavior of components. Components can also contain behavior because they have physical behavior, but also, they can contain more complicated functions that control their use. For example, a robot might have a motion planning function that can be used to control its behavior with higher-level commands. Since a work product is a physical entity, it is also considered a kind of component. Note that the workpiece itself can even contain computational elements like a tray that detects its contents or determines its own routing destination. Even a plain workpiece will have physical behavior and state, though.

The behavior of components causes work products to become modified. So, although a behavior can occur even when no workpiece is present, it is still the application of component's behavior to a workpiece that makes a machine do anything. The CPPU offers skills as the techniques for describing what it can do and initiating the behaviors that actually cause those things to happen. The skill itself describes what result is desired to be achieved on a given product though the specific chains of events that cause the result to happen are caused by behaviors.

The CPPU offers skills to external devices. These skills initiate actions included in the behavior and describe the result that will be applied to the product. Since skills can be distinguished from behavior, one can provide a skill interface for a CPPU without having to expose the behaviors that actually carry out the task. This is convenient because it allows skills to be specified using common interface protocols whereas the behavior of the unit will often need to be implemented in a domain specific language. As a result, implementing a skill is a matter of deriving the abstract representation of the skill that best matches the workpiece transformation that is desired and then attaching the programmatic version of that abstraction to the actual behavioral functions that carry out the duty.

It is potentially confusing that the word for skill does not imply the manner that it is employed in an application. A skill might refer to the abstract definition of the task this would be akin to its class or ontology. A skill can also refer to an instance of that abstraction as applied to a particular unit. For example, "fill the tray with red blocks" would be a skill instance for a specific task involving a tray and blocks. Additionally, a skill might refer to the execution of the skill on the unit. Skills are performed with behaviors; however, because there is a direct cause-effect relationship with a skill instance being set on a unit and the corresponding behaviors on that unit taking action to accomplish the skill, it can be considered that the skill is being executed. In the present disclosure, these different meanings for skill will be clarified when it is not obvious from the context.

A CPPU may be implemented on a programmable logic controller or another unit-level computing device tightly coupled with the components of the CPPU. In principle, one can use any kind of computer controlled media to communicate skill instances from the CPPS to a CPPU but a networking protocol is likely to be the most straightforward. The benefits of a network protocol such as web services include the ability to be easily extended and can be used with common communication equipment and programming libraries. A network protocol also can have arbitrary message length with well understood methods for encoding and decoding data. In the examples described herein, it is assumed that communication is carried out via a web services interface using Representational State Transfer (REST) protocol and using pre-defined Universal Resource Identifier (URI) tags. However, it should be understood that alternative technologies providing similar functionality may be employed in other embodiments of the present invention.

Skills may be implemented by system integrators and, thus, may not be anticipated based just on the type of process. The specifics of any given process will be unique as manufacturers apply their own know-how to add unique value to their products. For that reason, a simple protocol for skills may be utilized that allows the integrator to reflect their own idea of the process directly into the code structure of the units. Adding more information and semantics to the skill dataset is certainly possible, but should be considered additional to the core specification and not a fundamental requirement to developing skills.

The basic skill definition is a name with a set of parameters. The name can be as simple as a text string to denote which skill in the behavior implementation to execute. The parameter set is more interesting. In general, the parameter names can be string values like the skill name. Parameters could be optional and a given skill might be overloaded with different sets of parameters for different use cases. The parameter values could be constant values or constant expressions. Likewise, parameter values could be kept simple such as singleton floating point numbers, Booleans, or integers. Using simple parameters keeps the skill instance compact and efficient to communicate to the unit and store in the skill queue (described below).

A skill implementation includes a method of applying a skill instance to the unit as well as reflection methods for discovering what skills are available. The term "reflection," as used herein refers to a programming language's ability to inspect and dynamically call classes, methods, attributes, and other program-related information at runtime without needing specific knowledge a priori about the items being inspected. Reflection should include at least the list of all skills and their parameters, and could also include type information for the parameters including value limits, whether or not a parameter is optional, engineering units, and other constraining criteria. Skill discovery will likely occur at the time the unit is first activated so the list of skills should not be changing frequently. Most units will provide the same set of skills over its run and would not change unless the unit is reprogrammed or the system itself is reconfigured.

Because the CPPU is autonomous, skills would generally not be invoked from the outside like a function call. The CPPU would be able to detect its own state and determine the workpiece conditions according to its own abilities and would not be overly directed from the outside. When the workpieces and components are ready by the unit's own intelligence, it carries out its function. A straightforward solution is to treat each skill application as a kind of work order which is entered into an order queue on the unit.

Figure 6:
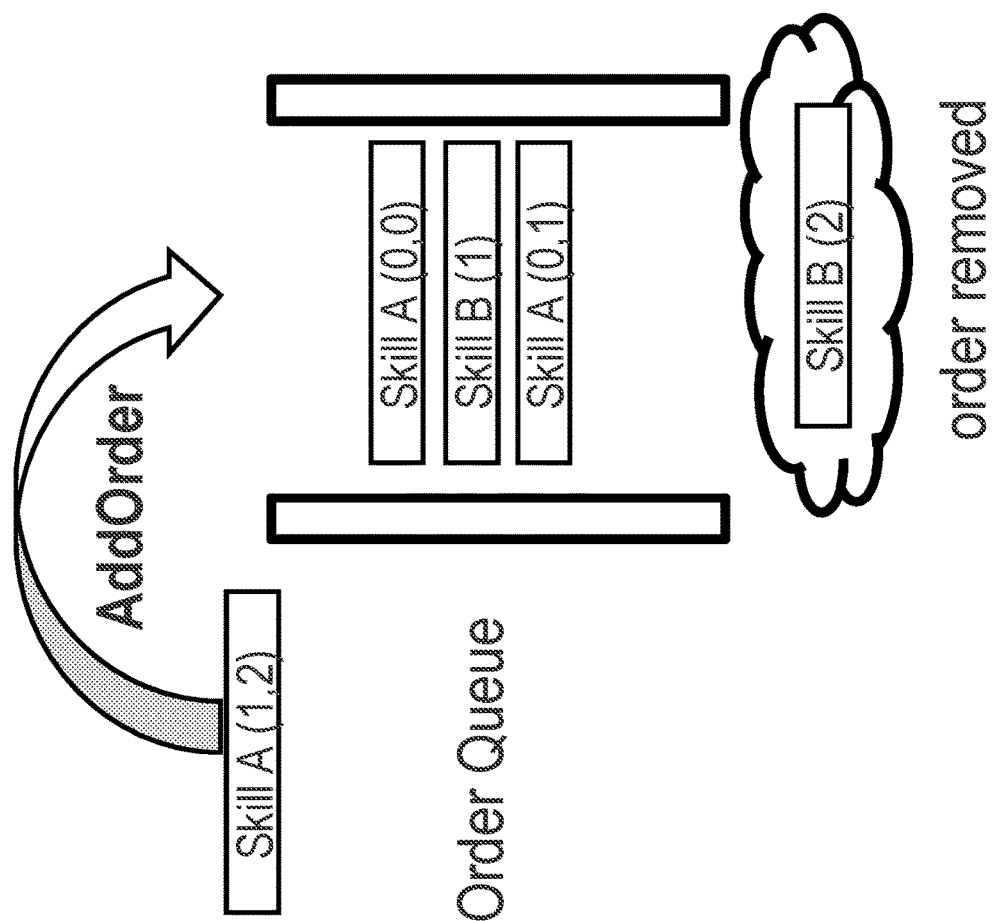
FIG. 6 shows provides an example of skill instances added to the order queue of the unit, according to some embodiments.

FIG. 6 provides an example of skill instances being added to the order queue of the unit, according to some embodiments. When a skill instance is added to a unit, it goes into the unit's order queue as shown in the figure. Once in the queue, the unit can view the contents of the skill instance and which kind of skill it is. Instances of the skill can be ordered so that skills are followed in a particular sequence, or a unit may skip instances that it cannot perform immediately for those later in the queue. For a generic skill implementation, the unit could access the parameters of the instance at the head of the queue. The unit could also scan the queue looking for instances that it can use. To do this, the unit would iterate through the queue using an index variable. For this reason, such a skill is called an "Index Skill" because the unit picks out the skill instance based on its position in the queue. The head of the queue would be index zero. When the unit has completed the order, it can remove the skill instance from the queue. Skill removal can act as a "done" message to the CPPS. It is also possible to have a call back, system message, or mutable parameter in the skill that the CPPS watches to determine the skill state.

In some embodiments, the CPPS is configured such that it does not apply a skill instance to a unit that could not actually perform the implied deed. From the CPPS perspective, sending a workpiece to a unit that cannot work with it is bad planning and would be prevented by the planning process itself. In other embodiments, an error mechanism may be provided when a bad skill instance is given to a unit and the CPPS may be configured to re-route the work materials to different units.

A similar predicament occurs when a unit breaks, gets turned off, or otherwise goes offline. In such a circumstance, all pending skill instances are purged from the unit and the unit's communication line goes into an error return state. The CPPS may at some point remove the entry of the unit from its database and plan anew under the new topology. Showing failures may not be a skill of the unit per se, but could be a fundamental unit state that needs to be communicated.

Figure 7:
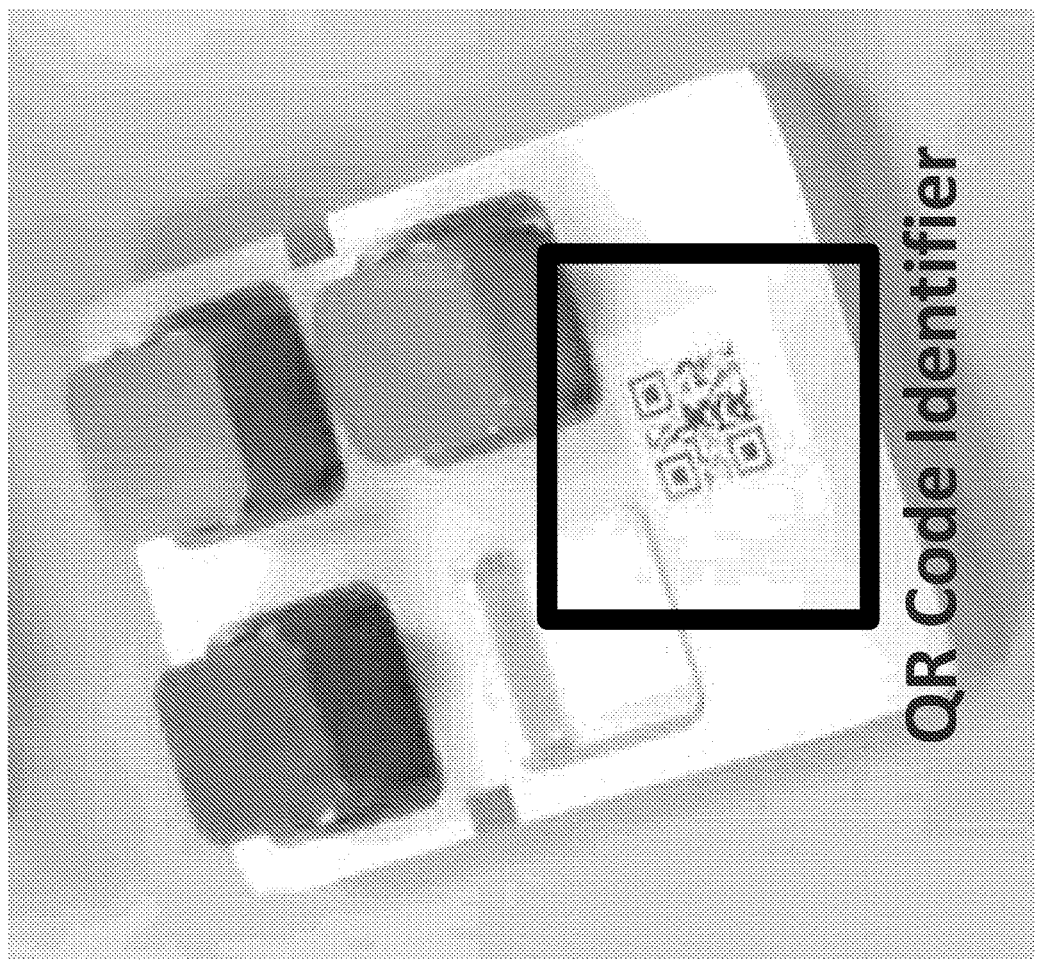
FIG. 7 shows an example of a QR-code identifier which identifies a work tray.

An operator, engineer, or other integrator can set up the implementation for a skill in many different ways, but one common case is that the work product (and usually the carrier of the work product) is identified by some kind of physical tag. This tag could be a bar code, QR-code, RFID tag, a printed number, etc. which would be read by a scanner or reader device included in the CPPU. An example of a QR-code identifier which identifies a work tray is shown in FIG. 7. The value of the identifier may be, for example, a number or alphanumeric string of characters. In some embodiments, a "Key Skill" is used to specify parameters for work products identified by this kind of tag. The Key Skill provides one special parameter, the key, whose value would match the identifier that the unit retrieves from the work product's tag. Using this, the unit can quickly pick out the skill instance that corresponds to the workpiece that it has at hand. In using this kind of skill, the CPPS would add all skill instances that would apply to the unit as soon as it was ready and would let the unit determine which to apply at a given time. Wildcards or other searching schemes generally known in the art may be used in some embodiments used to select skill instances by their key.

Figure 8:
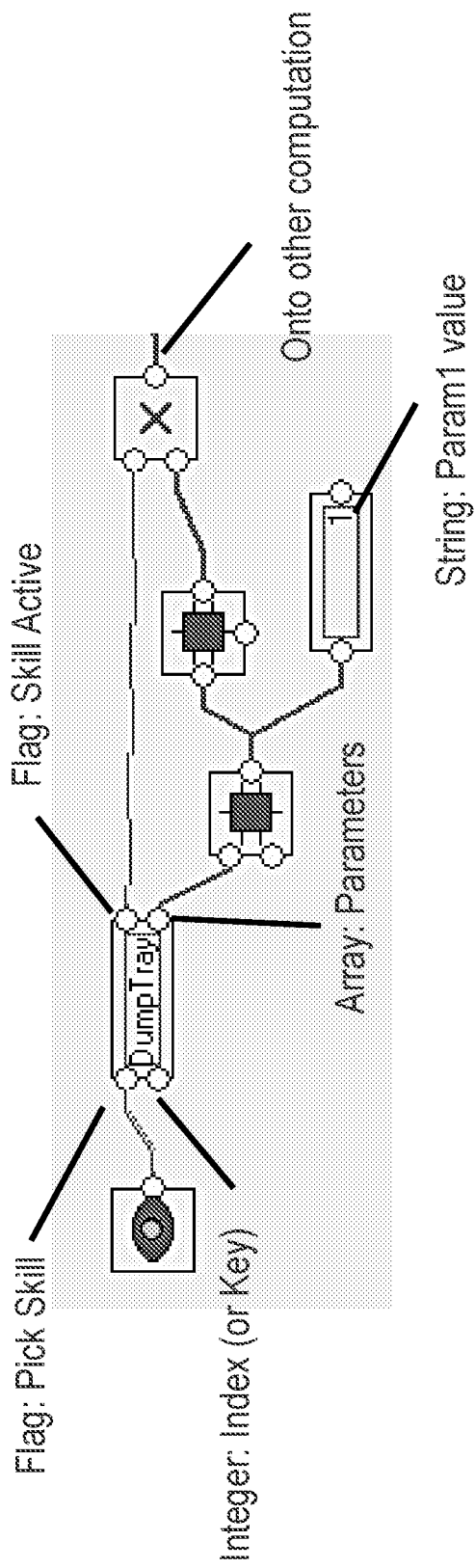
FIG. 8 illustrates an example of the skill interface where a dataflow language is used to implement the programmed behavior by specifying internal connections between skills and behaviors.

As described above, the internal programming of the unit is formed with behavior. Thus, to carry out the intention of a skill is to execute behaviors that manipulate the components that do the work. Programming a unit can be carried out in different languages; however, in general, any programming language known in the art may be used to define a skill class, pick a skill instance from the queue, and read the instance's parameters to be used in the rest of the program. Within the CPPU, a mix of programming languages may be used. For example, in some embodiments, the same programming language or functions may be used to define both skills and behaviors. In other embodiments, the programming language or functions used in defining skills and behaviors may be distinct FIG. 8 illustrates an example of the skill interface where a dataflow language is used to implement the programmed behavior by specifying internal connections between skills and behaviors. In the parlance of dataflow, input values are applied to a node in the graph. The node performs computation and the results are displayed on the output values. The outputs then can carry on to other nodes that do more computation, and so forth. In this example, the skill definition node uses two input values and provides two output values. The first input value is a flag that, when activated, causes the node to search for skills in the queue. The node defines configuration for the name of the skill and the list of parameter names the skill uses. In this case, the skill name is "DumpTray," and it has one skill parameter named "color" (not shown). The second input is an integer that identifies which skill instance in the queue should be selected. For a Key Skill type, the second input value is the value of the key to match the skill instance. If the node finds a skill, it sets the first output value to true to denote that the node is active. It also puts the values of the skill instance parameters into the second output listed in the same order as the parameter list. The example shows an array index node being used to pick out the value of the first parameter (the number "1") and it is displayed in a text box. When the program sets the skill node input flag to false, the node may be configured to automatically delete the skill that was last presented to its outputs.

Figure 9:
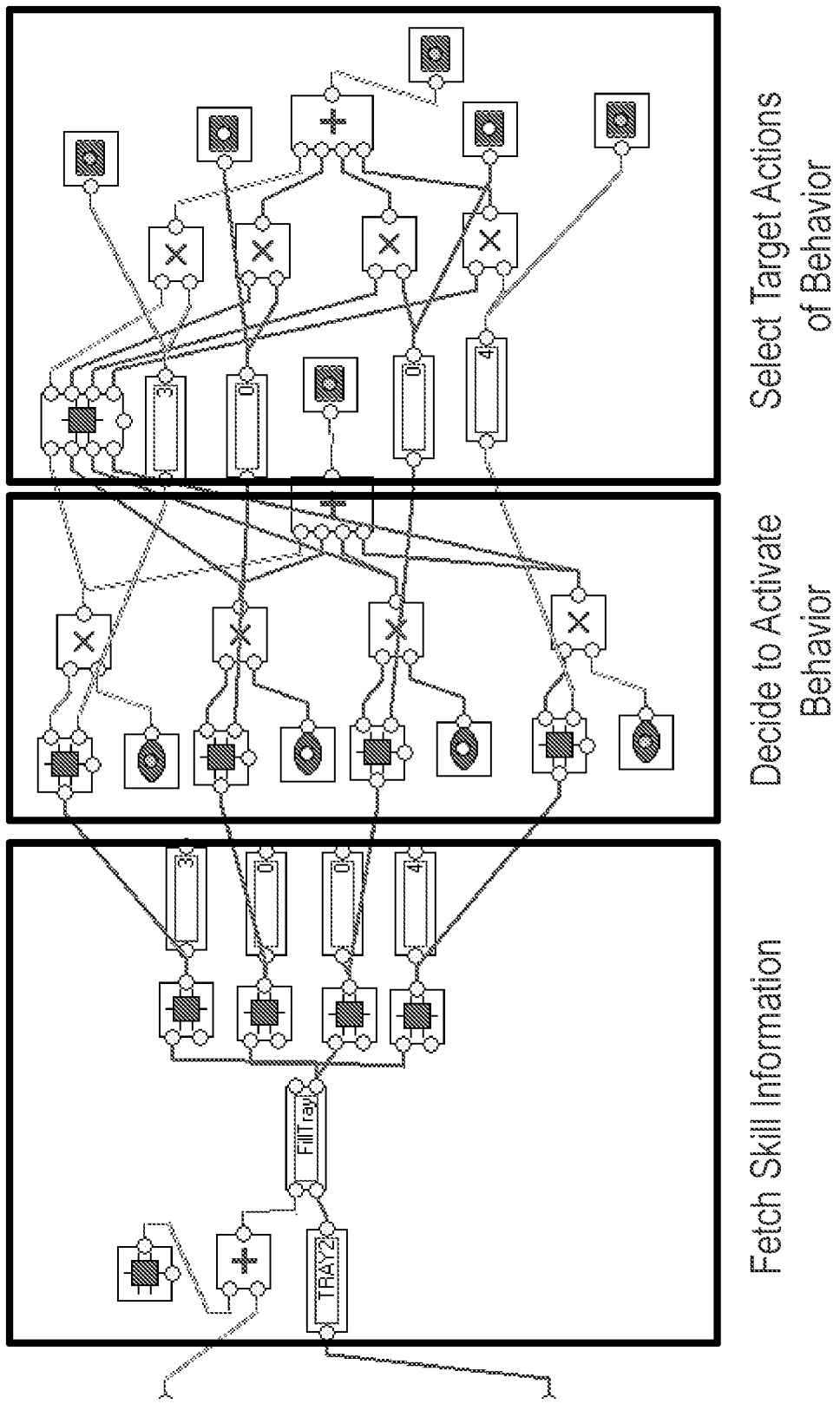
FIG. 9 provides an additional data flow example illustrating more complex skill behavior connection than shown in FIG. 8.

FIG. 9 provides an additional data flow example illustrating a more complex skill behavior connection than shown in FIG. 8. This example contains code for fetching the information from the skill instance, determining whether the unit has the necessary material to carry out the skill, and finally, it directs the other behaviors of the unit to perform actions. The behavior for implementing a skill in a different language would likely produce similar activities. The skill implementation shown in FIG. 9 is sufficient to execute behavior on behalf of a skill. It would also be appropriate to add further feedback. This example indicates completion when the skill instance is removed from the queue. In some embodiments, a skill instance is marked as being used and a value expresses how close to completion the behavior is at accomplishing the skill. In these implementations, one could provide a further input port for percent completed, though it would still be the programmed implementation of behaviors in the unit that would generate values for this port.

Though the techniques described herein make use of many common techniques, the manner in which these techniques are carried out differ from the traditional methods. For example, the whole architecture of separating the CPPS from the CPPU and defining the processes of communicating process operations as modifications to the work product are not found in conventional systems. In the usual method, machine operations are described in terms of the machine's behavior. A conveyor is turned on and off without regard for how a workpiece is affected. The whole new focus changes the design of the system from a series of hard-coded instructions into a set of intelligent actors who know their role and apply their skills to the task at hand.

At a more technical level, a standard interface mechanism built into a controller will usually act like a remote procedure call. This is how access to machine behavior is exported to the outside. A switch for turning the machine on and off may be exposed and some external controller may perform that operation. The effect is intended to be immediate like a function call in a programming language or writing a value to shared memory. The skill interface is not direct. The skills themselves act as orders that are put on a queue. The machine's own internal operations determine where and how to apply the orders to workpieces. The key skill versus index skill abstraction is used for the common case where workpieces can be identified by markers so that pertinent skills are easy to locate.

The skill interface is useful for automation but it also can be applied beyond to optimization and cost calculation. Skills can be used to communicate intentions to simulation systems that determine whether the process is possible and how it would affect the machine and associated systems. In this way, the skill abstraction becomes integral to the whole automation process from programming automation devices to scheduling and planning.

Various devices described herein including, without limitation, the control layer devices and related computing infrastructure may include at least one computer readable medium or memory for holding instructions programmed according to embodiments of the invention and for containing data structures, tables, records, or other data described herein. The term "computer readable medium" as used herein refers to any medium that participates in providing instructions to one or more processors for execution. A computer readable medium may take many forms including, but not limited to, non-transitory, non-volatile media, volatile media, and transmission media. Non-limiting examples of non-volatile media include optical disks, solid state drives, magnetic disks, and magneto-optical disks. Non-limiting examples of volatile media include dynamic memory. Non-limiting examples of transmission media include coaxial cables, copper wire, and fiber optics, including the wires that make up a system bus. Transmission media may also take the form of acoustic or light waves, such as those generated during radio wave and infrared data communications.

The aforementioned control layer devices and related computing infrastructure may include one or more processors for implementing the techniques described herein. The processors described herein as used by control devices may include one or more central processing units (CPUs), graphical processing units (GPUs), or any other processor known in the art. More generally, a processor as used herein is a device for executing machine-readable instructions stored on a computer readable medium, for performing tasks and may comprise any one or combination of, hardware and firmware. A processor may also comprise memory storing machine-readable instructions executable for performing tasks. A processor acts upon information by manipulating, analyzing, modifying, converting or transmitting information for use by an executable procedure or an information device, and/or by routing the information to an output device. A processor may use or comprise the capabilities of a computer, controller or microprocessor, for example, and be conditioned using executable instructions to perform special purpose functions not performed by a general purpose computer. A processor may be coupled (electrically and/or as comprising executable components) with any other processor enabling interaction and/or communication therebetween. A user interface processor or generator is a known element comprising electronic circuitry or software or a combination of both for generating display images or portions thereof. A user interface comprises one or more display images enabling user interaction with a processor or other device.

In some embodiments portions of the CPPU, including the skill interface, are implemented using one or more executable applications. An executable application, as used herein, comprises code or machine readable instructions for conditioning the processor to implement predetermined functions, such as those of an operating system, a context data acquisition system, or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters.

The functions and process steps herein may be performed automatically, wholly or partially in response to user command. An activity (including a step) performed automatically is performed in response to one or more executable instructions or device operation without user direct initiation of the activity.

The system and processes of the figures are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. As described herein, the various systems, subsystems, agents, managers, and processes can be implemented using hardware components, software components, and/or combinations thereof. No claim element herein is to be construed under the provisions of 35 U.S.C. 112, sixth paragraph, unless the element is expressly recited using the phrase "means for."

The invention claimed is:

1. A cyber-physical production system comprising:
a plurality of cyber-physical production units configured to collectively produce a product comprising one or more workpieces, each of the cyber-physical production units comprising:
one or more automation system devices,
a network interface configured to receive one or more skill instances, each skill instance providing a skill name and a set of parameters that provide a machine-independent description of how a workpiece is to be transformed for ultimate conversion into a final product by the one or more automation system devices,
an order queue configured to store the one or more skill instances, and
a processor configured to:
reorder the order queue based on a preferred sequence after entering the skill instance in the order queue,
interpret each skill instance and execute computational or physical behaviors of the automation system devices corresponding to each of the one or more skill instances, wherein a dataflow language implements the computational or physical behaviors by specifying connections between skill instances and behaviors according to input values and output values of graph nodes with at least one of the nodes configured to search for at least one of the skill instances in the order queue and the input values comprising a search flag indicating to conduct the search or delete the associated skill instance and a key value for matching, wherein at least one of the output values of the graph nodes is carried on to other nodes to do more computation; and
execute the one or more skill instances to transform the workpiece and communicate with the cyber-physical production system via the network interface the state of executed behaviors and corresponding transformations to the workpiece.

2. The cyber-physical production system of claim 1, wherein the network interface of each cyber-physical unit comprises a web services interface using Representational State Transfer (REST) protocol to receive one or more skill instances.

3. The cyber-physical production system of claim 1, wherein the processor is further configured to execute the one or more skill instances in order, skipping skill instances that cannot be executed immediately.

4. The cyber-physical production system of claim 1, wherein each cyber-physical production unit further comprises:
   a scanner device configured to read a physical tag on the workpiece, the physical tag specifying a Universal Resource Identifier (URI) corresponding to the workpiece,
wherein the one or more skill instances comprises a key skill having a key parameter with a value for matching the URI read from the physical tag on the workpiece, and
   wherein the processor uses the URI to associate the one or more skill instances in the order queue with the workpiece during execution.

5. The cyber-physical production system of claim 1, wherein the processor is further configured to transmit a message to the cyber-physical production system indicating completion of a skill instance upon removal of the skill instance from the order queue for execution.

6. The cyber-physical production system of claim 1, wherein the processor is further configured to modify a skill state parameter of a skill instance upon removal of the skill instance from the order queue for execution.

7. The cyber-physical production system of claim 1, further comprising a transport system for transporting workpieces to the cyber-physical production units, wherein each of the cyber-physical production units works autonomously in that actions from other cyber-physical production units are not required to function outside of the transport system bringing workpieces in and out of the cyber-physical production unit.

8. A computer-implemented method for using a skill interface to control a cyber-physical production unit in a cyber-physical production system, the method comprising:
   receiving a skill instance via a network interface providing a skill name and a set of parameters that provide a machine-independent description of how a workpiece is to be transformed for ultimate conversion into a final product by one or more automation system devices included in the cyber-physical production unit;
   entering the skill instance into an order queue comprising one or more additional skill instances;
   reordering the order queue based on a preferred sequence after entering the skill instance in the order queue;
   interpreting each skill instance and selectively executing computational or physical behaviors of the automation system devices corresponding to each skill instance in the unit order queue, wherein a dataflow language implements the computational or physical behaviors by specifying connections between skill instances and behaviors according to input values and output values of graph nodes with at least one of the nodes configured to search for at least one of the skill instances in the order queue and the input values comprising a search flag indicating to conduct the search or delete the associated skill instance and a key value for matching, wherein at least one of the output values of the graph nodes is carried on to other nodes to do more computation; and
   executing the skill instances to transform the workpiece and communicating with the cyber-physical production system via the network interface the status of executed behaviors and corresponding transformations to the workpiece.

9. The method of claim 8, further comprising wherein skill instances in the order queue are executed in order, skipping skill instances that cannot be executed immediately.

10. The method of claim 8, further comprising:
   reading, by a scanner device, a physical tag on the workpiece, the physical tag specifying a Universal Resource Identifier (URI) corresponding to the workpiece,
   receiving at least one skill instance comprising a key skill having a key parameter with a value for matching the URI read from the physical tag on the workpiece, and
   using the URI to associate the skill instance with the workpiece during execution.

11. The method of claim 8, further comprising:
   transmitting a message to a cyber-physical production system indicating completion of a skill instance upon removal of the skill instance from the order queue for execution.

12. The method of claim 8, further comprising:
   modifying a skill state parameter of a skill instance upon removal of the skill instance from the order queue for execution.

13. The method of claim 8, wherein the cyber-physical production system further comprises a transport system for transporting workpieces to the cyber-physical production units, the method further comprising:
   each of the cyber-physical production units works autonomously in that actions from other cyber-physical production units are not required to function outside of the transport system bringing workpieces in and out of the cyber-physical production unit.

* * * * *